Figure 1:
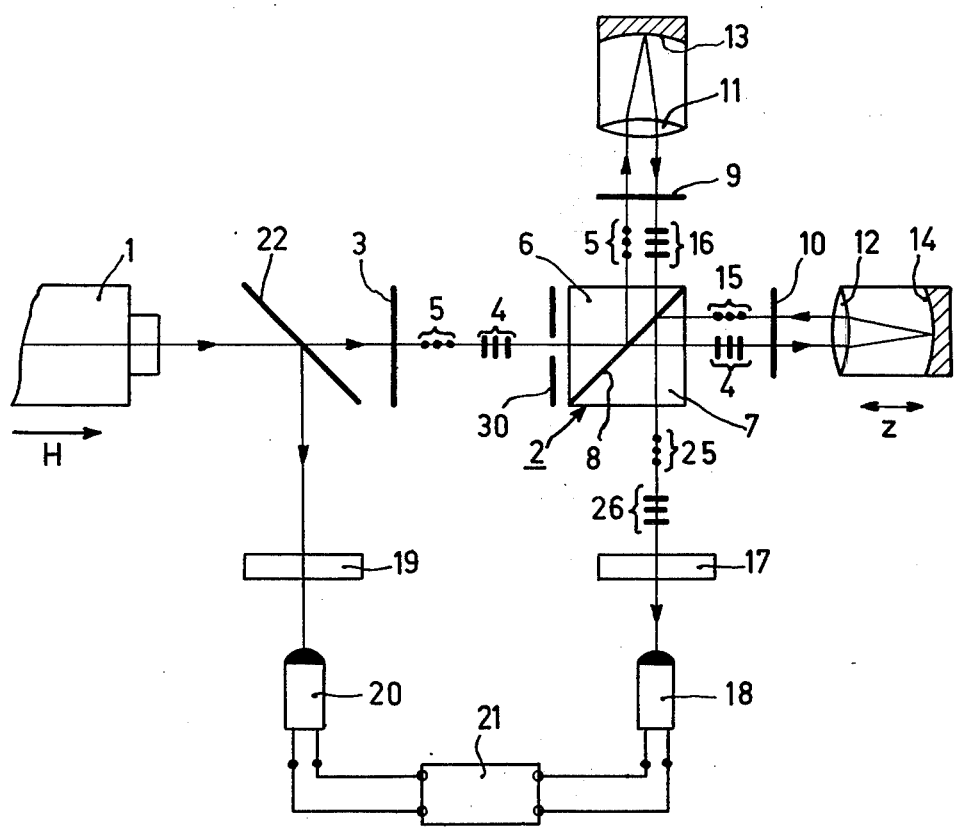

United States Patent [19]
De Lang et al.

[11] 3,881,823
[45] May 6, 1975

[54] APPARATUS FOR MEASURING THE VARIATION OF AN OPTICAL PATH LENGTH WITH THE AID OF AN INTERFEROMETER

[75] Inventors: Hendrik De Lang, Delft; Eric Tapley Ferguson, Emmasingel, Eindhoven, both of Netherlands

[73] Assignee: U.S. Philips Corporation, New York, N.Y.

[22] Filed: Nov. 12, 1970

[21] Appl. No.: 89,090

Related U.S. Application Data

[63] Continuation of Ser. No. 733,341, May 31, 1968, abandoned.

[30] Foreign Application Priority Data
June 2, 1967 Netherlands.................... 6707681

[52] U.S. Cl............................................ 356/106 R
[51] Int. Cl. .............................................. G01b 9/02
[58] Field of Search ........................... 356/106–113, 356/106 R

[56] References Cited
UNITED STATES PATENTS

| | | | |
|---|---|---|---|
| 3,409,375 | 11/1968 | Hubbard............................ | 356/106 |
| 3,458,259 | 7/1969 | Bagley et al. ...................... | 356/106 |
| 3,463,924 | 8/1969 | Culshaw et al. .................... | 250/199 |
| 3,503,682 | 3/1970 | Botcheron ....................... | 356/114 X |
| 3,529,894 | 9/1970 | Hock ................................. | 356/113 |

*Primary Examiner*—Ronald L. Wibert
*Assistant Examiner*—Conrad Clark
*Attorney, Agent, or Firm*—Frank R. Trifari; Simon L. Cohen

[57] ABSTRACT

A device for measuring variation of an optical path length with the aid of an interferometer including a laser generating two differently polarized coherent beams which are spatially separated by an isotropic beam splitter and at least one separated beam and preferably both include in their respective paths phase anisotropic elements. A beam splitter recombines the beams and a radiation detector measures the resultant difference. In a further embodiment two detectors are employed and a phase comparison effected. In a still further embodiment, a second isotropic beam splitting unit is employed with a pair of radiation detectors respectively picking up mutually orthogonally polarized beams and generating first and second output signals for comparison.

3 Claims, 2 Drawing Figures

APPARATUS FOR MEASURING THE VARIATION OF AN OPTICAL PATH LENGTH WITH THE AID OF AN INTERFEROMETER

This application is a continuation of Ser. No. 733,341 filed May 31, 1968, and now abandoned.

The invention relates to an apparatus for measuring the variation of an optical path length with the aid of an interferometer, in which a beam of electromagnetic radiation produced by a source of radiation is separated with the aid of optical means into two spatially separate partial beams which are recombined and impinge on a radiation-sensitive detector, which delivers an output signal.

Such apparatus is known. It may be used, for example, in machine tools to determine the displacement of the tool relative to the workpiece and to provide data for controlling the machine tool.

In many cases the output signal must be a measure not only of the absolute value of the displacement but also of the direction in which the displacement takes place. In addition, it often is desirable for the output signal to appear as an alternating-voltage signal even if the object is stationary, because an alternating-voltage signal can be processed with greater electric reliability than a direct-voltage signal. The first requirement can be satisfied by placing a birefringent element in the path of one of the partial beams so that the phase of the recombined partial beams becomes dependent upon the direction of polarization of that partial beam which has twice passed through the birefringent element. To obtain an alternating-voltage output signal, for example, an object arranged in the path of one of the partial beams may be set into vibration, but this frequently gives rise to mechanical and/or electrical complications.

It is an object of the invention to satisfy the above mentioned requirements in an elegant manner. For this purpose it is characterized in that the radiation source produces two differently polarized coherent beams having different frequencies by including phase-anisotropic elements in the path of at least one of the partial beams, the state of polarization of its radiation incident on the optical means which recombine the partial beams is orthogonal to the state of polarization of the radiation which emerges from the beam-splitting optical means.

The term "coherent beams having different frequencies" is to be understood to mean beams having mutual phases which are coupled so tightly that the beams can give rise to interference phenomena.

It should be noted that a radiation source which produces two differently polarized coherent beams is known.

In order to limit the radiation losses between the radiation source and the detector and to restrict the feedback to the radiation source, preferably a polarization-sensitive beam-splitting system is included in the radiation path between the radiation source and the detector.

According to one aspect of the invention, the optical means is a polarization-sensitive beam-splitting system and the output signal of the radiation-sensitive detector is compared with a signal produced by a beam which has been separated from the radiation beam and impinges on a second radiation-sensitive detector.

According to another aspect of the invention, the optical means is an isotropic or nearly isotropic beam-splitting system. In the path of the radiation between the isotropic system and the radiation-sensitive detector a polarization-sensitive beam-splitting system is positioned for directing part of the radiation to a second radiation-sensitive detector, the output signals produced by the mutually orthogonally polarized beams incident on the detectors being compared with one another.

The change in the polarization state is preferably effected by at least one birefringent element included in the path of at least one of the partial beams, the difference in thickness between the element or elements in one partial beam and that or those in the other partial beam being $n \lambda/4$ ($n = 0, 1, 2, 3, \ldots$).

In order to ensure that the energy emitted from the radiation source is stable in respect of magnitude, frequencies and polarization states, it be desirable that there is no feedback of the radiation to the source. For this purpose, when the partial beams are recombined after reflection, axes of the reflecting objects are shifted with respect to the axes of the partial beams formed by the beam-splitting system.

The invention is based on the recognition that two orthogonally polarized beams having two different frequencies may give rise to signals the mutual phase of which is a measure of the displacement to be measured.

Figure 2:
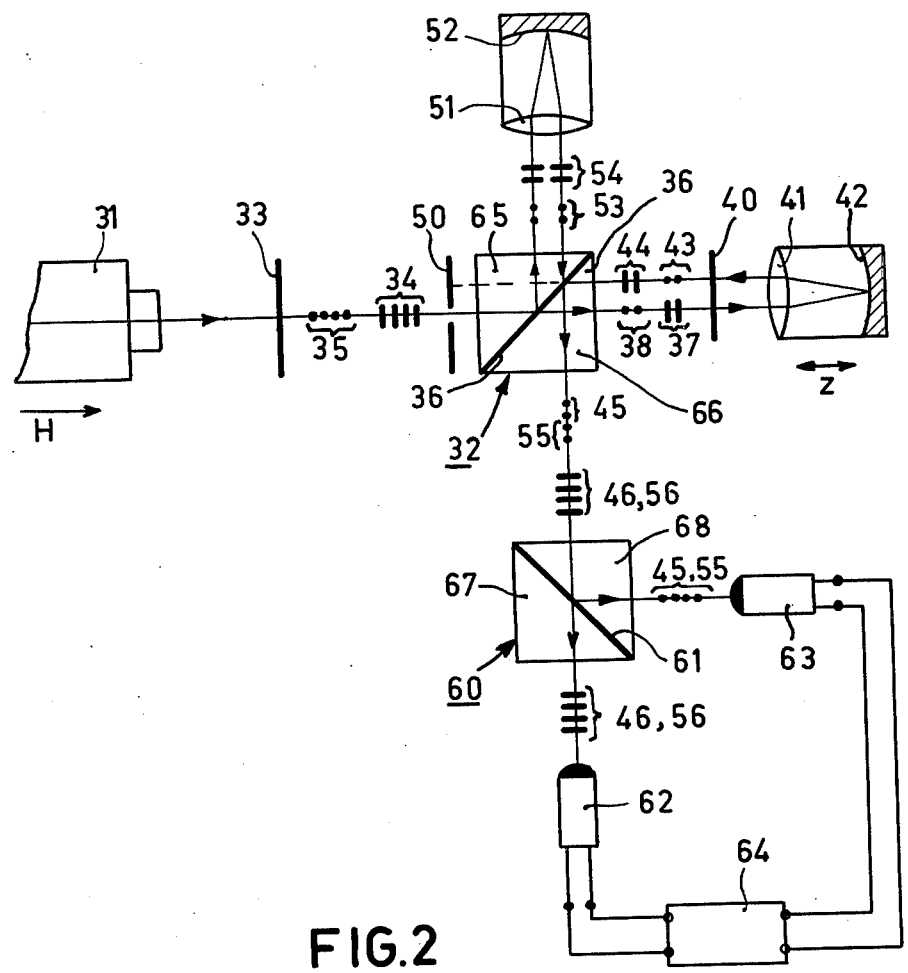

The invention will now be described more fully with reference to the accompanying diagrammatic drawings, in which FIG. 1 is a first embodiment of an apparatus in accordance with the invention, and FIG. 2 is a second embodiment.

FIG. 1 shows a maser 1, for example, a helium-neon laser operating at a wavelength of $1.153\mu$. In known manner the maser (or laser) is designed so as to oscillate in only one longitudinal mode. The maser 1 is surrounded by a magnetic coil. The coil current generates a magnetic field H which causes the maser oscillation to be divided in two oppositely circularly polarized oscillations of different frequencies. The frequency difference of, for example, 0.2 mc/s is very small with respect to the maser frequency. The radiation at two frequencies which emerges from the maser is incident on a $\lambda/4$ plate 3, the main directions of which are at an angle of 45° to the plane of the drawing. As a result, there emerge from the plate 3 a beam 4 at one angular frequency ($\omega_2$) the direction of polarization of which is parallel to the plane of the drawing, and a beam 5 at the other angular frequency ($\omega_1$) the direction of polarization of which is normal to the plane of the drawing.

The beams 4 and 5 impinge on a polarization-selective dividing prism 2 which comprises two parts 6 and 7, the boundary 8 of which is provided with reflecting layers of alternately high and low indices of refraction. The beams impinge on this boundary 8 at the Brewster angle in a manner such that a proper choice of the thicknesses of the layers ensures that, in the wavelength range used, the beam 4 is transmitted whereas the beam 5 is nearly totally reflected. These partial beams each pass through a $\lambda/4$ plate 9 and 10 respectively in diagonal position, i.e. the principal axes of the plates are at angles of 45° to the plane of the drawing. The partial beams impinge on retrodirective systems which may, for example, be lenses 11 and 12 respectively in the focal planes of which plane or concave mirrors 13 and 14 respectively are placed. The beam which is reflected by the mirror 13 or 14 and is exactly parallel to, but shifted with respect to, itself before being reflected, again passes through the λ/4 plate 9 and 10, respectively, the plane of polarization of the reflected beam being rotated 90° with respect to that of the beam prior to reflection.

The beam 4 which is not reflected at the boundary 8 is reflected by the retrodirective system 12, 14 so as to return with a polarization rotated through 90°. The returning beam 15 now is reflected at the boundary 8 to form a beam 25 having a direction of polarization normal to the plane of the drawing. The beam 5 reflected at the boundary 8 is reflected from the retrodirective system 11, 13 and returns with a direction of polarization rotated through 90°, in the form of a beam 16 with its direction of polarization parallel to the plane of the drawing.

At the boundary 8 the beam 16 is not reflected. The transmitted beam 26 still has a direction of polarization parallel to the plane of the drawing. The partial beams 25 and 26 pass through a polarizer 17 in diagonal position and then impinge on a radiation-sensitive element 18. Because the beams 25 and 26, like the beams 4 and 5 consist of radiations at different frequencies ($\omega_2$ and $\omega_1$), there will be produced at the radiation-sensitive element 18 a signal at a frequency equal to the difference frequency of the two beams. The phase of the signal at this difference frequency is a measure of the difference of the optical paths traveled by the two beams and thus provides a measure of the position of the displaceable retrodirective system 12, 14. Displacement of the retrodirective system 12, 14 results in a change in the phase of the beam incident on the radiation-sensitive element 18 and hence in a change in the phase of the alternating-voltage signal produced by this element 18. This phase is compared with the phase of an alternating-voltage signal produced in a radiation-sensitive element 20, on which, through a polarizer 19, impinges a part of the beam produced by the maser 1, which part has been separated by the beam splitting mirror 22. By the polarizer 19 the two beams which have been separated from the maser beam by the beam splitting mirror 22 and are circularly polarized in opposite senses, are converted into linearly polarized beams by which in the radiation-sensitive element 20 alternating voltages are again produced, the frequency of which is equal to the difference of the frequencies of the two oscillations produced in the maser 1. The output signals of the radiation-sensitive element 20 may serve as references for the output signals of the radiation-sensitive element 18. These oscillations may be supplied to a phase comparison stage or to a pulse counting device 21, which responds in opposite senses to the passages through zero of the signals at the outputs of the radiation-sensitive elements 18 and 20. The phase of the reference oscillation at the output of the radiation-sensitive element 20 may, if desired, be adjusted by rotating the polarizer 19. Preferably the direction of transmission of the polarizer is parallel to the principal direction of the mirror 22. Such an adjustment may be useful, for example, for control purposes.

When the boundary 8 is not ideal, there is advantageously interposed between the beam-splitting prism 2 and the radiation source 1 a diaphragm 30 which intercepts the residual radiation from the system 11, 13 which is reflected at the boundary 8 and/or the residual radiation from the system 12, 14 which is transmitted by this boundary.

In a practical embodiment of an apparatus as shown in FIG. 1, with digital measurement a displacement of many meters could be measured in steps of $\lambda/4 = 0.3\mu$.

In the apparatus shown in FIG. 2, two oscillations which are circularly polarized in opposite senses and have different frequencies are derived from a laser 31 in a manner identical to that described with reference to FIG. 1. These oscillations pass through a λ/4-plate 33 the principal directions of which make an angle of 45° with the plane of the drawing. From the plate 33 there emerge a beam 34 at one angular frequency($\omega_2$) the direction of polarization of which is parallel to the plane of the drawing, and a beam 35 at the other angular frequency ($\omega_1$) the direction of polarization of which is at right angles to the plane of the drawing.

The beams 34 and 35 impinge on a substantially isotropic beam-splitting prism 32 which comrises two parts 65 and 66. At the boundary 36 of the parts 65 and 66 part of each of the beams 34 and 35 is reflected and part of each of these beams is transmitted. The transmitted partial beams 37 and 38 impinge, through a λ/4 plate 40, on a retrodirective system 41, 42. The reflected beams again pass through the λ/4 plate 40. After the beams 37 and 38 at angular frequencies $\omega_2$ and $\omega_1$ respectively have twice passed through the plate 40 their planes of polarization have been rotated 90° for the principal axes of the plate 40 again are at an angle off 45° to the plane of the drawing.

The reflected beams 43 (at angular frequency $\omega_2$) and 44 (at angular frequency $\omega_1$) then impinge on the isotropic beam-splitting prism 32. At the boundary 36 part of each of these beams is reflected to form a beam 45 (at angular frequency $\omega_2$) and a beam 46 (at angular frequency $\omega_1$). On reflection at the boundary 36, the direction of polarization of the incident beams is not, or substantially not, changed i.e. the direction of polarization of the beam 45 is normal to the plane of the drawing and that of the beam 46 is parallel to the plane of the drawing.

The parts of the beams 34 and 35 which are reflected from the boundary 36 after reflection from a retrodirective system 51, 52 again impinge on the isotropic beam-splitting prism 32. The respective partial beams 53(at angular frequency $\omega_1$) and 54 (at angular frequency $\omega_2$) have the same directions of polarization as the beams 34 and 35. These partial beams 53 and 54 are partly transmitted by the boundary 36 and partly reflected from it. The transmitted beams 55 (at angular frequency $\omega_1$) and 56 (at angular frequency $\omega_2$) together with the reflected beams 45 and 46 impinge on a polarization-selective beam-splitting prism 60. The beams impinge at the Brewster angle on the boundary 61 of the two parts 67 and 68 which together form the beam-splitting prism 60. The boundary 61 is such that the partial beams 46 and 56 the plane of polarization of which is parallel to the plane of the drawing are transmitted and impinge on a radiation-sensitive element 62, whereas the partial beams 45 and 55 the plane of polarization of which is normal to the plane of the drawing are reflected and impinge on a radiation-sensitive element 63.

The amplitude of the beam 46 contains the factor sin ($\omega_1 t - kz$), where z is the displacement of the retrodirective system 41, 42. The amplitude of the beam 56 contains the factor sin $\omega_2 t$. Consequently, the alternating-voltage signal produced by the element 62 contains the factor sin $[(\omega_1 t - kz) - \omega_2 t]$, i.e. the factor sin $[(\omega_1 - \omega_2) t - kz]$.

The amplitude of the beam 45 contains the factor sin $(\omega_2 t - kz)$, that of the beam 55 the factor sin $\omega_1 t$. Consequently, the alternating-voltage signal generated by the detector 63 contains the factor sin $[\omega_2{}_1 t - (\omega_2 t - kz)]$, i.e. the factor sin $[(\omega_1 - \omega_2) t + kz]$.

The sensitivity of the apparatus of FIG. 2 to the path differences to be measured is twice that of the apparatus of FIG. 1, for the signal from the detector 20 contains the factor sin $(\omega_1 - \omega_2) t$ and that from the detector 18 the factor sin $[(\omega_1 - \omega_2) t - kz]$. In other words, in the apparatus of FIG. 1, displacements of the object through a distance $\lambda/4$ result in a counting pulse in the counting device 21, whereas in the apparatus of FIG. 2 even displacements through a distance $\lambda/8$ result in a counting pulse in the counting device 64.

Similarly to what is the case in the apparatus of FIG. 1, in the apparatus of FIG. 2 the axes of the retrodirective systems are shifted with respect to those of the insident beams. This shift is necessary especially in the apparatus shown in FIG. 2, because the beam-splitting prism 33 is, or nearly is, isotropic. To prevent feedback of the reflected beams to the laser source 31, there is interposed between the element 32 and this source 31 a diaphragm 50 which intercepts any beam from the system 41, 42 which passes through the boundary 36 and any beam from the system 51, 52 which is reflected at this boundary. These beams may however also serve to produce once more the signal as generated in 62 and 63 (but now shifted in phase by 180°).

What is claimed is:

1. A device for measuring the variation of a variable optical path length, comprising optical generating means for producing two orthogonally polarized coherent beams of electromagnetic radiation having different frequencies, a substantially isotropic beam splitting surface for dividing said beams into first and second partial beams each containing both oo said different frequencies, first reflecting means in the path of the first partial beam for redirecting said first partial beam, second reflecting means movable in the direction of the second partial beam and positioned in the path of the second partial beam for redirecting said second partial beam, a phase anisotropic element in the path of at least one of said partial beams for rotating the plane of polarization of the corresponding partial beam by an angle equal to an odd multiple of 90°, a first photodetector, and a polarization-sensitive beam splitter in the path of both redirected partial beams for transmitting at least part of each sub-beam to the first photodetector and for directing a further portion of the radiation from the polarization-sensitive beam splitter to the second photodetector, the portion of the radiation directed to the second photodetector having a plane of polarization substantially orthogonal with respect to the radiation directed to the first photodetector, the radiation directed to each photodetector containing both frequencies produced by the optical generating means.

2. A device for measuring the variation of a variable optical path length, comprising optical generating means for producing two orthogonally polarized beams of electromagnetic radiation each having a different frequency, an isotropic beam splitter in the path of the radiation from the optical generating means for dividing the radiation from the optical generating means into a first and a second partial beam each containing both frequencies of coherent radiation, a first reflecting means in the path of the first partial beam for redirecting the first partial beam toward the isotropic beam splitter, a second reflecting means mounted for movement along the path of the second partial beam for redirecting the second partial beam toward the isotropic beam splitter, a phase anisotropic element in the path of at least one of the partial beams for rotating the plane of polarization of the corresponding partial beam by an angle equal to an integral multiple of 90°, a polarization-sensitive beam splitter in the path of the redirected partial beams emanating from the isotropic beam splitter, the polarization-sensitive beam splitter being positioned to reflect substantially all the radiation of a first polarization and to pass substantially all the radiation of an orthogonal polarization thereby to separate the redirected partial beams into a third and fourth partial beam each containing coherent radiation of a single polarization direction and each containing both frequencies produced by the optical generating means, a first photo-detector in the path of the third partial beam, a second photo-detecctor in the path of the fourth partial beam, and electronic means for comparing the electrical output of the first and second photo-detectors.

3. A combination of claim 1, wherein the first and second reflecting means comprise means for redirecting the impinging first and second partial beams along a path parallel to and displaced from the respective impinging beams.

* * * * *

UNITED STATES PATENT AND TRADEMARK OFFICE
CERTIFICATE OF CORRECTION

PATENT NO. : 3,881,823
DATED : May 6, 1975
INVENTOR(S) : HENDRIK DE LANG and ERIC TAPLEY FERGUSON It is certified that error appears in the above-identified patent and that said Letters Patent are hereby corrected as shown below:

IN THE SPECIFICATION

Col. 1, line 42, "by" should be --. By--;

Col. 3, line 5, "and" should be --or--;

Col. 4, line 19, "comrises" should be --comprises--;

line 30, "off" should be --of--;

Col. 5, line 21 "insi-" should be --inci- --;

IN THE CLAIMS

Claim 1, line 7, "oo" should be --of--;

Claim 2, line 30, "photo-detecctor" should be --photo-detector--;

Signed and Sealed this twenty-fifth Day of November 1975

[SEAL]

Attest:

RUTH C. MASON
Attesting Officer

C. MARSHALL DANN
Commissioner of Patents and Trademarks